April 27, 1937.     A. E. SCHUELER     2,078,690
WELDING SYSTEM
Filed Aug. 15, 1934
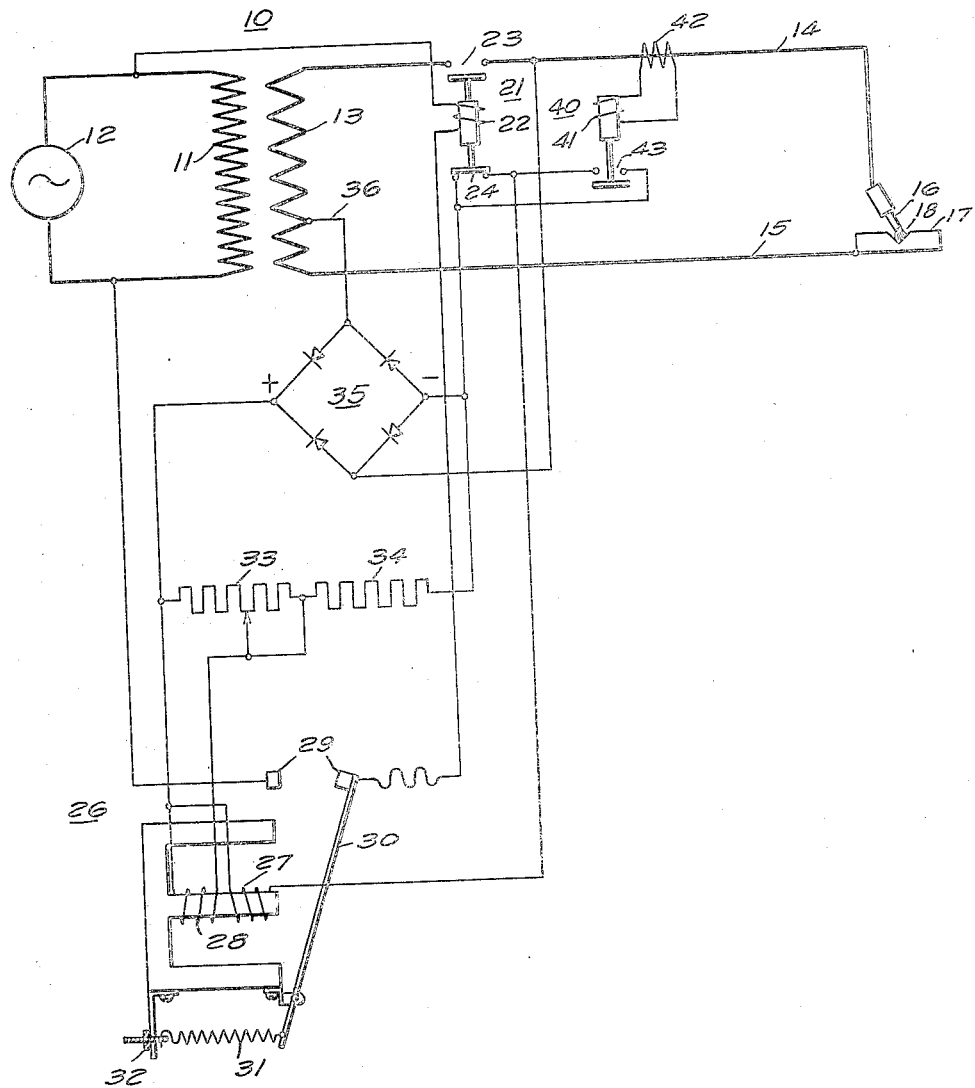
WITNESSES:
INVENTOR
Alfred E. Schueler.
BY
ATTORNEY Patented Apr. 27, 1937

2,078,690

UNITED STATES PATENT OFFICE 2,078,690

WELDING SYSTEM

Alfred E. Schueler, Wilkinsburg, Pa., assignor to Westinghouse Electric & Manufacturing Company, East Pittsburgh, Pa., a corporation of Pennsylvania Application August 15, 1934, Serial No. 739,894

9 Claims. (Cl. 219—8)

My invention relates, generally, to welding apparatus and it has particular relation to arc welding apparatus.

In arc welding, it is desirable to use a source of welding current having a relatively high open circuit voltage in order to readily start the welding arc and to maintain it in operation. In many instances, it is desirable to use an open circuit voltage of 100 to 140 volts. It is especially desirable to use such a voltage range when the welding operation is to be performed with high values of alternating current, such as 500 to 750 amperes.

However, the high open circuit voltage, when applied to the welding circuit creates an undesirable hazard to the welding operator and to other workmen who may accidentally come in contact with it. While the welding operation is being performed, the voltage applied to the welding circuit is, of course, considerably lower than the open circuit voltage and is not dangerous. However, as soon as the welding operation ceases, the full open circuit voltage is applied to the welding circuit.

It is, therefore, desirable to provide for automatically reducing the open circuit voltage, as applied to the welding circuit, when the welding operation is not being performed. However, it is desirable to maintain the high open circuit or operating voltage applied to the welding circuit for a predetermined interval after welding current ceases to flow in order to permit the operator to take advantage of the high open circuit voltage characteristic of the welding source for immediately restarting the arc. In the event that the arc is not restruck within the predetermined interval, it is then desirable that the high open circuit voltage be removed from the welding circuit.

The object of my invention, generally stated, is to provide an arc welding system which shall be simple and efficient in operation and which may be readily and economically manufactured and installed.

The principal object of my invention is to provide for automatically connecting an arc welding circuit to a high operating voltage on completion of the welding circuit and for automatically disconnecting it therefrom on cessation of flow of welding current.

An important object of my invention is to provide for automatically connecting an arc welding circuit to a high operating voltage immediately on completion of the welding circuit and for automatically disconnecting the welding circuit therefrom at the expiration of a predetermined interval after current ceases to flow in the welding circuit.

Another object of my invention is to provide for automatically connecting an arc welding circuit to a high operating voltage immediately on completion of the welding circuit and for automatically disconnecting it therefrom at the expiration of a regulatable time interval after current ceases to flow in the welding circuit.

Other objects of my invention will, in part, be obvious and, in part, appear hereinafter.

My invention accordingly is disclosed in the embodiment hereof shown in the accompanying drawing and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawing, in which the single figure represents, diagrammatically, one concrete embodiment of my invention.

According to my invention, I provide a line switch for connecting a source of relatively high operating voltage, which may be the secondary winding of a welding transformer, to a welding circuit. The line switch is arranged to be automatically closed by means of a time delay relay, which is energized from a low voltage tap on the secondary winding when the welding circuit is completed, by causing the welding electrode to come into contact engagement with the work forming the other electrode. As long as welding current continues to flow, the time delay relay will remain energized and the line switch will remain closed. When the current in the welding circuit ceases to flow, the time delay relay is de-energized. However, due to its particular operating characteristics, the time delay relay does not immediately open the energizing circuit for the line switch and, therefore, the latter remains in the closed position for a predetermined interval after welding current ceases to flow. In the event that welding current is not caused to flow again within the interval during which the time delay relay remains operated, the energizing circuit for the line switch will be opened and the high operating voltage will no longer be applied to the welding circuit.

Referring now particularly to the single figure of the drawing, the reference character 10 designates generally a welding transformer having a primary winding 11 which may be connected to a source of alternating current 12. The transformer 10 is also provided with a secondary winding 13 which is connected to apply an operating voltage to a welding circuit comprising conductors 14 and 15 and to cause welding current to flow therethrough. It will be observed that the conductors 14 and 15 are connected respectively to a welding electrode 16 and work 17 between which a welding arc 18 may be maintained for performing the welding operation.

In order to connect the welding circuit comprising the conductors 14 and 15 to the secondary winding 13 of the transformer 10, a line switch 21 is provided having an operating winding 22. The line switch 21 is provided with "make" contact members 23 which are arranged to connect the conductor 14 to one terminal of the secondary winding 13, the other terminal thereof being permanently connected to the conductor 15. The line switch 22 is also provided with "break" contact members 24 for a purpose which will be set forth hereinafter.

In order to effect the closure of the line switch 21 a time delay relay, shown generally at 26, is provided for energizing the operating winding 22. The time delay relay 26 is provided with a main operating winding 27 and a neutralizing winding 28. When the main operating winding 27 is energized, contact members 29 are closed to complete a circuit for energizing the operating winding 22.

It will be noted that one of the contact members 29 is mounted on an armature 30, which may be biased by means of a spring 31, and the tension of which may be adjusted by means of an adjusting nut 32. The tension applied to the spring 31 determines, in part, the time required for the contact members 29 to open after the main winding 27 is deenergized.

The neutralizing winding 28 is connected for energization across a potentiometer 33 which, in turn, is connected in series circuit relation with a resistor 34. The potentiometer and series connected resistor are connected across the direct current terminals of a rectifier 35. The flux generated by the neutralizing winding 28 is in such direction as to oppose the flux which is generated by the main winding 27. There is, therefore, no residual magnetism tending to hold the armature 30 in the closed position and it is possible to adjust its opening time within certain limits, as may be desired, either by adjusting the tension of the spring 31 or by adjusting the voltage which is applied to the neutralizing winding 28 by means of the potentiometer 33.

For a more complete understanding of the characteristics of operation of the time delay relay 26, reference may be had to Patent No. 1,753,983 to Cook, patented April 8, 1930 and assigned to the assignee of this application.

It will be observed that the rectifier 35 is connected between a low voltage tap 36 on the secondary winding 13 of the welding transformer 10, and the conductor 14. Thus, when the welding electrode 16 is caused to engage the work 17, an alternating current potential is applied across the rectifier 35, which is the voltage existing between the conductor 15 and the tap 36. This voltage is rectified by the rectifier 35 and is applied in the form of direct current to the neutralizing winding 28 and to the main winding 27, thereby energizing the time delay relay 26 which, in turn, causes the line switch 21 to be operated.

Since the operation of the line switch 21 opens the "break" contact members 24, which form a part of the energizing circuit for the main winding 27, it is necessary that means be provided for maintaining the energizing circuit for the main winding 27 as long as the welding operation is being performed. For this purpose, a current responsive relay, shown generally at 40, is provided having an operating winding 41, which is connected to be energized from a secondary winding 42 of a current transformer. As shown the secondary winding 42 is disposed around the conductor 14, which forms a single turn primary winding. It will be observed that the current responsive relay 40 is provided with "make" contact members 43 which are connected in shunt circuit relation with the "break" contact members 24.

In operation, it will be assumed that the welding transformer 10 is energized and that the full operating voltage exists across the terminals of the secondary winding 13. This voltage may be of the order of 100 to 140 volts, while the voltage existing between the conductor 15 and the tap 36 may be of the order of 30 to 40 volts. It will be also assumed that the remaining apparatus is in the non-operated position, as illustrated in the drawing.

Under these conditions, only a comparatively low voltage is applied to the welding circuit comprising the conductors 14 and 15, since the voltage which is applied thereto is that which exists between the conductor 15 and the low voltage tap 36. Therefore, if any person accidentally engages the welding circuit, the voltage which is encountered will not be dangerous.

The operator desiring to initiate the welding operation contacts the welding electrode 16 with the work 17. As a result, current is caused to flow through the rectifier 35 which is changed thereby into direct current, and applied to the neutralizing winding 28 and to the main winding 27. Since the flux which is generated by the main winding 27 is considerably greater than that generated by the neutralizing winding 28, the armature 30 is moved to the closed position and the contact members 29 complete an obvious energizing circuit for the operating winding 22. Contact members 23 of the line switch 21 are then closed and the full operating voltage is applied across the welding circuit.

It will be recalled that the closing of the line switch 21 opens the energizing circuit for the main winding 27 at "break" contact members 24. The energizing circuit for the main winding 27, however, is maintained by the closure of contact members 43 as soon as current flows in the welding circuit due to the energization of the current responsive relay 40.

As long as current continues to flow in the welding circuit, the contact members 43 will be held in the closed position and the main winding 27 will be energized. As soon as current ceases to flow in the welding circuit, the operating winding 41 of the current responsive relay 40 is deenergized and contact members 43 are opened. The energizing circuit for the main winding 27 is then open. However, due to the time delay characteristics of the relay 26, contact members 29 are not immediately opened and, therefore, the line switch 21 is maintained in the closed position. The contact members 29 will be held in the closed position for a predetermined interval. If, during this interval, the operator again causes current to flow in the welding circuit, the current responsive relay 40 is again energized and the energizing circuit for the main winding 27 is again completed.

However, if current is not again caused to flow in the welding circuit within the predetermined interval, contact members 29 will be opened at the expiration thereof, thereby opening the energizing circuit for the operating winding 22 of the line switch 21. As a result, the contact members 23 will be opened and the full operating voltage will no longer be applied to the welding circuit. When the operator desires to again initiate the welding operation, the foregoing sequence of functioning may again be caused to take place.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. An arc welding system comprising, in combination, an arc welding circuit connected to a welding electrode and work on which a welding operation is to be performed, a source of current for energizing the welding circuit, an electro-magnetic switch operable to connect the welding circuit to the current source, and means including a time delay relay operable in response to the engagement of the electrode to the work for effecting the energization and closure of said electro-magnetic switch, said time delay relay being disposed to thereafter function to hold the electro-magnetic switch closed for a predetermined interval after the welding circuit has been opened to terminate the flow of welding current.

2. An alternating current arc welding system comprising, in combination, a source of alternating current power, a welding circuit connected to a welding electrode and work on which a welding operation is to be performed, a welding transformer connected between the power source and welding circuit, an electrically-operated line switch for connecting the welding circuit to the secondary winding of the transformer, means including a time-delay relay operable in response to the engagement of the electrode to the work for energizing and closing the line switch, and means responsive to the opening of the welding circuit for initiating the operation of the time-delay relay to effect the deenergization of the line switch after a predetermined interval of time dependent upon the welding circuit remaining open during said time interval.

3. An arc welding system comprising, in combination, a welding circuit connected to welding electrodes adapted to strike an arc, a source of welding current for the welding circuit having a relatively high open circuit voltage, means for applying a portion of the open circuit voltage to the welding circuit when it is open, switch means for automatically applying the high open circuit voltage to the welding circuit on completion thereof, and electro-magnetic time delay relay means for holding said switch means closed to continue to apply the high open circuit voltage to the welding circuit until the expiration of a predetermined time interval after the welding circuit is opened.

4. An arc welding system, comprising, in combination, a welding circuit connected to welding electrodes between which an arc may be struck, means for applying a reduced voltage to the welding circuit when it is open, switch means for applying an operating voltage to the welding circuit, operating means for said switch means, and time delay means disposed to be automatically energized by application thereto of the reduced voltage on completion of the welding circuit for effecting the energization of said operating means to close the switch means thereby applying the operating voltage to the welding circuit, said time delay means being disposed to maintain said operating means energized until the expiration of a predetermined interval after the welding circuit is opened.

5. An arc welding system comprising, in combination, a welding circuit connected to welding electrodes between which an arc may be struck, a source of welding current for the welding circuit having a relatively high open circuit voltage, means for applying a portion of the open circuit voltage to the welding circuit when it is open, switch means for applying the high open circuit voltage to the welding circuit, operating means for said switch means, time delay means disposed to be automatically energized by application thereto of said portion of the open circuit voltage on completion of the welding circuit for effecting the energization of said operating means to close the switch means thereby applying the high open circuit voltage to the welding circuit, and means responsive to the flow of welding current for maintaining said time delay means energized on flow of welding current, said time delay means being disposed to maintain said operating means energized until the expiration of a predetermined interval after welding current ceases to flow.

6. An arc welding system comprising, in combination, a welding circuit including welding electrodes adapted to strike an arc, a transformer having a primary winding for connection to an alternating current source and a secondary winding provided with a low voltage tap for connection to the welding circuit, a switch for connecting the secondary winding to the welding circuit, an operating winding for said switch, and a time delay relay interposed between said low voltage tap and the welding circuit and disposed to be energized on completion of the welding circuit, said time delay relay being disposed to effect the energization of said operating winding to close said switch and to maintain said operating winding energized for holding said switch closed for a predetermined interval after the welding circuit is opened.

7. An arc welding system comprising, in combination, a welding circuit including welding electrodes adapted to strike an arc, a transformer having a primary winding for connection to an alternating current source and a secondary winding provided with a low voltage tap for connection to the welding circuit, a switch having make contact members for connecting the secondary winding to the welding circuit and break contact members, an operating winding for said switch, a time delay relay connected between said low voltage tap and the welding circuit through said break contact members and disposed to be energized on completion of the welding circuit for energizing said operating winding to operate said switch, and a current responsive relay connected to be energized on flow of welding current and provided with make contact members connected in parallel circuit relation with said break contact members for maintaining said time delay relay energized as long as current continues to flow in said welding circuit, said time delay relay being disposed to maintain said operating winding energized for a predetermined interval after current ceases to flow in said welding circuit.

8. An arc welding system comprising, in combination, a welding circuit including welding electrodes adapted to strike an arc, a transformer having a primary winding for connection to an alternating current source and a secondary winding provided with a low voltage tap for connection to the welding circuit, a switch having make contact members for connecting the secondary winding to the welding circuit and break contact members, an operating winding for said switch, a rectifier connected between said low voltage tap and the welding circuit, a time delay relay disposed to effect the energization of said operating winding to operate said switch, said time delay relay being provided with a neutralizing winding and a main winding, said neutralizing winding being connected to be energized by direct current from said rectifier, said main winding being connected through said break contact members to be energized by direct current from said rectifier, and a current responsive relay connected to be energized on flow of welding current and provided with make contact members connected in parallel circuit relation with said break contact members for maintaining said main winding energized as long as current continues to flow in said welding circuit, said time delay relay being disposed to maintain said operating winding energized for a predetermined interval after current ceases to flow in said welding circuit.

9. In an alternating current arc welding system, in combination, a source of alternating current power, a welding circuit, a transformer interposed between the power source and the welding circuit, said transformer having a low-voltage tap on its secondary winding, a line switch for connecting the welding circuit across the secondary winding, a circuit connecting the low-voltage tap to the welding circuit, and means responsive to the completion of the welding circuit through the low-voltage tap connection for energizing the line switch to connect the welding circuit across the secondary winding, said means being further operable in response to a subsequent opening of the welding circuit for a predetermined time interval for effecting the deenergization of the line switch.

ALFRED E. SCHUELER.